United States Patent Office 2,979,826
Patented Apr. 18, 1961

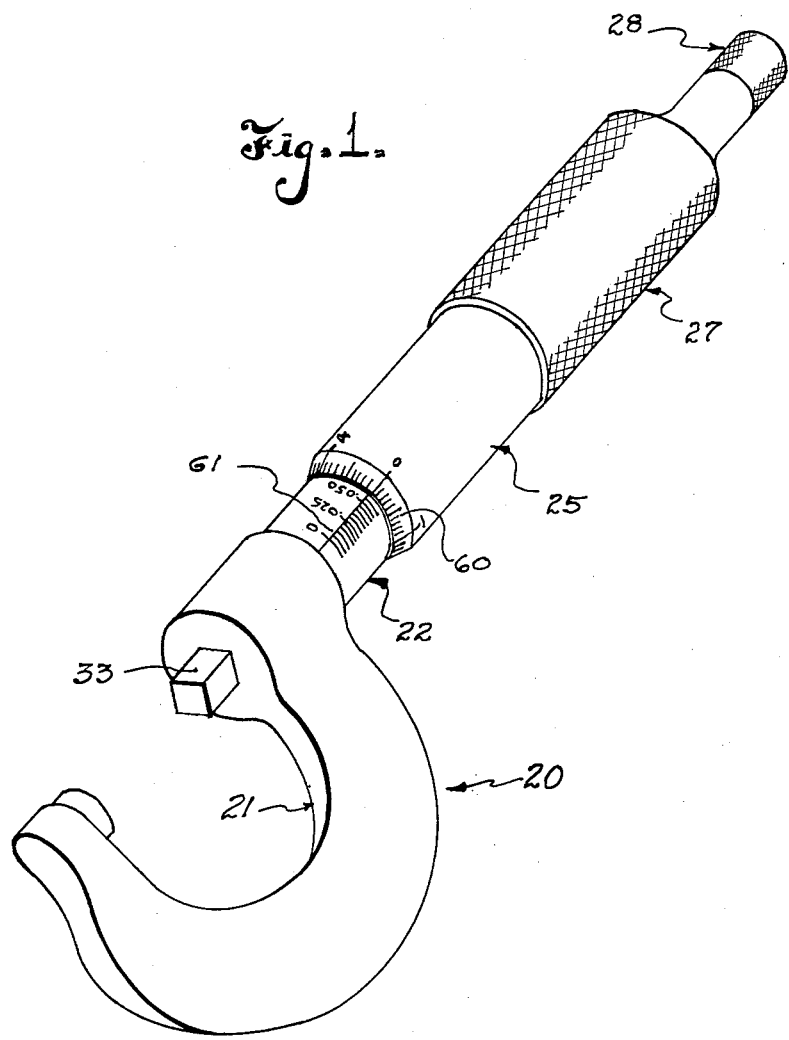

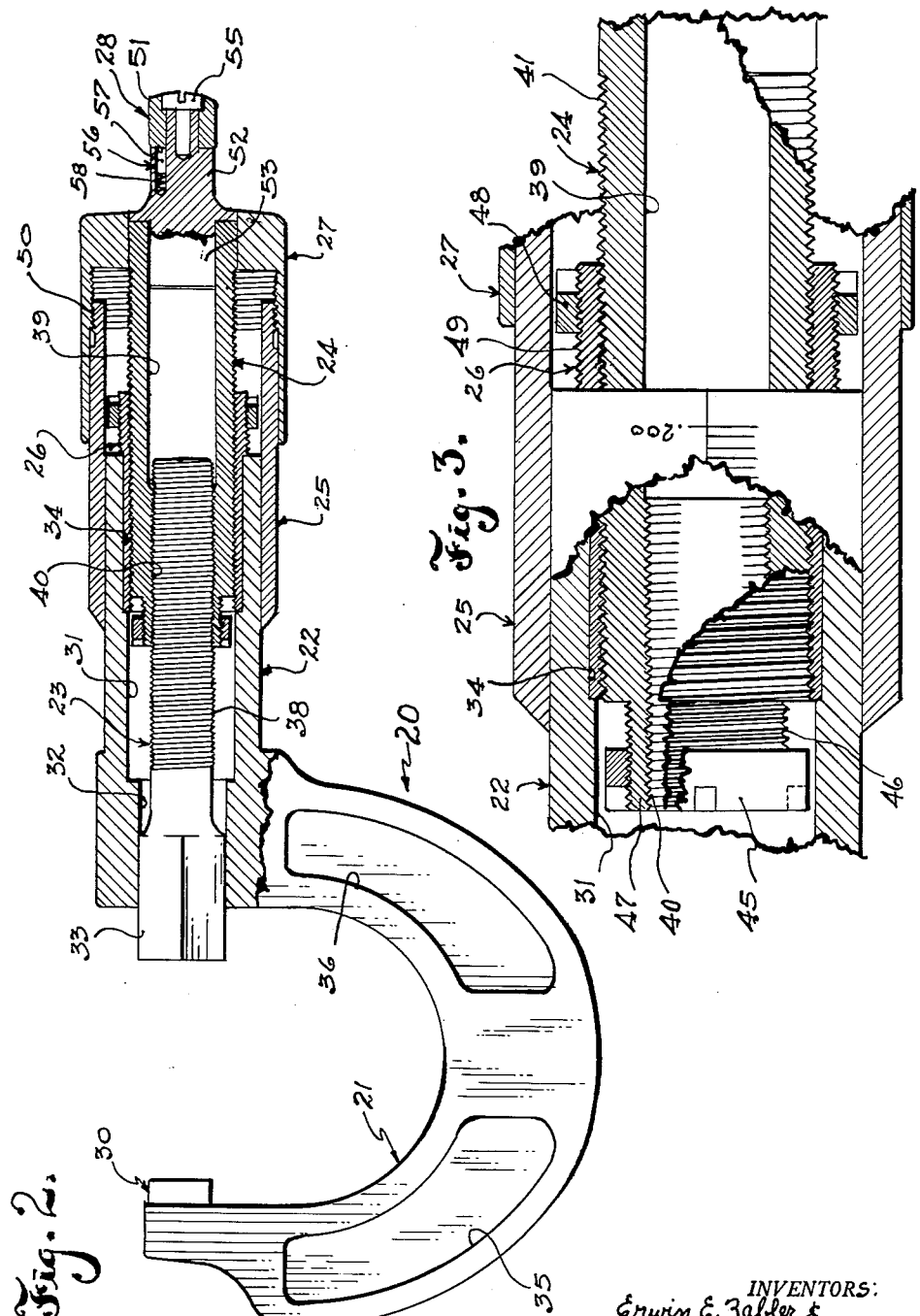

2,979,826

MICROMETER GAUGE

Erwin E. Zabler, 645 S. Lombard Ave., Oak Park, Ill., and Jerome C. Magid, 4151 W. 78th Place, Chicago, Ill.

Filed June 4, 1958, Ser. No. 739,846

1 Claim. (Cl. 33—164)

This invention relates, in general, to micrometer gauges and is particularly concerned with improvements whereby more accurate measurements can be made.

Otherwise stated, the invention is embodied in a micrometer having features so that in one revolution of the thimble sleeve it divides into five thousandths of an inch, whereas the conventional micrometer in every-day use with spindles having forty threads per inch divides one revolution into twenty-five thousandths of an inch. Accordingly, the micrometer of the present invention provides a five to one finer calibration.

An important object and accomplishment of the invention is to provide a micrometer for obtaining accurate, precise and minute measurements.

Another object and accomplishment of the invention is to provide an improved, simple and reliable means whereby the range of a given instrument may be extended without necessitating undue longitudinal movement of the micrometer screw and without otherwise detracting from the required delicacy and precision in measuring operations.

Another important object and accomplishment of the invention is to provide a micrometer which is easy to read, one in which the spindle may be moved to the work to be measured, and one in which the work engaging spindle does not turn or rotate thereby reducing wear on the spindle and providing more accurate measurements.

It is important to note that the thimble sleeve on the micrometer of the present invention is slightly larger in diameter than conventional tools and therefore it can be calibrated into fifty equal parts, thereby permitting a direct reading in one ten thousandths of an inch. Furthermore, by using a tenth of a thousandth calibration as is used in conventional tools and applying same to the micrometer of the present invention, direct readings to one hundred thousandths of an inch can be obtained. Otherwise stated, the lateral travel of one inch of the thimble sleeve on the conventional tools gives a reading of one inch, whereas the lateral travel of one inch of the thimble sleeve of the present invention advances the measuring rod two hundred thousandths of an inch. In order to give the micrometer of the present invention the range of one inch as conventional tools are presently arranged, supplementary anvils in increments of two hundred thousandths of an inch may be added.

The type of micrometer most used today has a spindle secured or fastened to a thimble or sleeve, which sleeve is turned in order to determine the distance to be measured by the micrometer. In this type both the sleeve and the spindle rotate. Such a micrometer is shown by the Witchger Patent No. 2,212,910.

The micrometer of this invention has the spindle connected to the sleeve by means of an intermediate sleeve. This intermediate sleeve has both internal and external screw threads, which give the advantage of a much finer calibration of the indicating scale. Another advantage in the subject micrometer is due to the fact that the sliding portion of the spindle has a square-shape which prevents it from being rotated as the sleeve is turned.

Another object and accomplishment of the invention is to provide a micrometer wherein the anvils, or stationary contact member are replacable. The replacement feature provides that the anvil may be replaced when worn or that one size anvil may be substituted for another size anvil.

An important object and accomplishment of the invention is to provide a micrometer having an intermediate sleeve, said sleeve having internal and external screw threads, thereby providing the additional advantages of permitting the compounding of the screw threads in a single sleeve to effect the finer calibration on the indicating scale.

An ancillary object and accomplishment of the invention is to provide a new and improved micrometer which is adapted to be economically manufactured and which is so designed as to permit the manufacture and assembly thereof in accordance with present day large scale mass production manufacturing methods of construction and assembly.

The invention seeks as a final object and accomplishment to provide a micrometer of the character indicated and which is particularly characterized by a design arrangement to more advantageously and satisfactorily perform the functions required of it and adapted to provide a compact unit which will successfully combine the factors of structural simplicity and durability and yet be economical to manufacture.

Additional objects, features and advantages of the invention disclosed herein will be apparent to persons skilled in the art after the construction and operation are understood from the within description.

It is preferred to accomplish the various objects of this invention and to practice the same in substantially the manner as hereinafter more fully described and as more particularly pointed out in the appended claims.

Embodiments of the invention are illustrated in the accompanying drawings forming a part hereof and wherein:

Fig. 1 is a perspective view of the micrometer of the subject invention and embodying the features of the present invention;

Fig. 2 is a side elevational view of the micrometer illustrated in Fig. 1 with portions thereof shown in section to more clearly illustrate the internal construction thereof;

Fig. 3 is a sectional view of the internally and externally threaded sleeve to more clearly illustrate the compound thread feature of the present invention.

The drawings are to be understood to be more or less of a schematic character for the purpose of illustrating and disclosing a typical or preferred form of the improvements contemplated herein and in the drawings like reference characters identifying the same parts in the several views.

In the exemplary embodiment of the invention depicted in Figs. 1, 2 and 3, the micrometer gauge with which the present invention is particularly concerned comprises, in general, a frame designated in its entirety by the numeral 20 and has portions thereof 21 defining a generally U-shape adapted to receive and accommodate the work, and a barrel-shaped hub and housing 22 adapted to accommodate the gauge operating mechanism which comprises a screw slide or spindle 23, an inner sleeve 24, an outer sleeve 25, a threaded liner 26, a thimble 27, and a fine adjustment ratchet stop mechanism 28.

As may best be seen in Figs. 2 and 3, the frame 20 is provided with an anvil 30 and the barrel-shaped hub 22 has a through bore, portions of which as at 32 are square-shaped to receive for sliding movement therein the square-shaped end portions 33 of the screw slide 23. A counterbore 34 is provided to accommodate the threaded liner 26. The U-shaped portions 21 of the frame 20 may be provided with cut-outs as at 35 and 36 in Fig. 2 in order to reduce the weight or may be plain as shown in Fig. 1.

The screw slide 23 some times referred to as the spindle comprises the square-shaped end 33 and the shank of which has threaded portions 38 which are fifty threads per inch right hand helix.

In Figs. 2 and 3 it can be seen that the inner threaded sleeve 24 has a through bore 39, portions 40 of which are threaded fifty threads per inch and is adapted to accommodate the threaded portions 38 of the spindle 23. The outside periphery of the inner threaded sleeve 24 is threaded forty threads per inch right hand helix as at 41.

The inner sleeve 24 is provided with a compression nut 45 threaded on screw heads 46 disposed on the stud portion 47 of the inner sleeve 24. Also, the threaded liner 26 is provided with a compression nut 48 threaded on screw threads 49 disposed on the periphery of the threaded liner 26. These compression nuts are arranged to provide proper adjustment and slip but just enough friction so that the respective parts may be easily rotated by manual operation of the device.

Attention is invited to Fig. 2 wherein it can be seen that the thimble 27 is removably mounted on the outer sleeve 25 and is arranged to rotate with said outer sleeve 25 upon manual operation of the device. The thimble 27 may be removed from the outer sleeve 25 for purposes of repair or replacement of parts disposed within the housing 22 by rotating the thimble 27 independently of the outer sleeve 25 whereby the thimble 27 by means of the screw threads 50 will be removed from its normal operating position on the outer sleeve 25 as shown in Fig. 2.

In order to obtain very fine readings and to provide proper compression of the work piece being measured between the anvil 30 and the square-shaped hand 33 there is provided a fine adjustment ratchet stop mechanism indicated in its entirety by the numeral 28 and which may best be seen in Fig. 2. The ratchet stop mechanism 28 comprises a rotatable member 51 mounted on a shank 52 having portions 53 press fitted into the through bore 39 of the inner sleeve 24. The shank portions 52 are arranged to rotate with the inner sleeve 24. In order to maintain the rotatable member 51 in its proper operating position there is provided a screw 55 which is removable from its normal operating position as shown in Fig. 2 in order that the rotatable member 51 may be removed from its normal operating position for access to the ratchet mechanism 56 which comprises a pawl 57 and a spring 58 arranged to urge the pawl 57 into engagement with adjacent portions of the rotatable member 51.

Thus, it can be seen that when normal operating pressure is used in rotating the rotatable member 51 to cause rotation of the various parts to bring the anvil 30 and the square-shaped end 33 into contact with the piece being measured and disposed therebetween, the ratchet mechanism is inoperative until resistant pressure is encountered. The gauge should be read just at the point before the ratchet mechanism begins to operate permitting the rotatable member 51 to be manually rotated while the shank portions 52 and the other parts connected therewith will remain stationary.

In Figs. 1 and 3 it can be seen that by graduating the outer sleeve 25 as at 60 between the zero and one thousandths division into ten equal parts, it is possible to obtain a direct reading of tenths of a thousandth of an inch.

By graduating the housing 22 as at 61 with ten divisions at right angles to the divisions 60, it is possible to obtain direct readings of one, one hundred thousandths of an inch.

It is notable that conventional micrometers, in use at the present time with spindles having forty threads per inch, divides one revolution into twenty-five thousandths of an inch. The micrometer contemplated by the present invention provides a five to one finer calibration for each revolution of the thimble 27. Also, the thimble 27 being of a larger diameter than found on conventional tools permits it to be calibrated into fifty equal parts, thereby permitting a direct reading in one ten thousands of an inch. Furthermore, by using a tenth of a thousandth of an inch calibration similar to that found on conventional tools, it is possible to get a direct reading of one, one hundred thousandths part of an inch on the micrometer contemplated by this invention. Otherwise stated, the lateral travel of one inch of the thimble 27 on a conventional micrometer available in the market today will give a reading of one inch, whereas the lateral travel of one inch of the thimble sleeve 27 of the micrometer contemplated by this invention advances the measuring rod two hundred thousandths of an inch.

In order to provide the range of one inch to the micrometer of the present invention, supplementary anvils (not shown) in increments of two hundred thousandths of an inch may be provided as follows: 000" to .200"; .200" to .400"; .400" to .600"; .600" to .800". The anvil 30 carried by the micrometer measures the distance of .800" to 1.000".

This procedure would repeat itself in all micrometers beyond the one inch range, namely one inch to two inch, two inch to three inch, three inch to four inch, etc.

Thus, it can be seen that the present invention contemplates compounding an accurately lapped fifty threads per inch screw 40 into an accurately lapped forty threads per inch screw 41, both being right hand. The forty thread screw 41 making one revolution, advances or retracts the screw slide 23 one fortieth of an inch or twenty-five thousandths of an inch. As this is taking place, the fifty threads per inch screw 40 retracts or advances the screw slide 23 one fiftieth part of an inch or twenty-thousandths part of an inch. The screw slide 23 being square and accurately fitted into the aperture 32 in the housing 22 can only slide rather than rotate. The movement of the thimble sleeve 27 and the screw slide 23 are in a direct reverse motion of each other resulting in a forward or retarding movement of only five thousandths parts of an inch for every revolution.

Because of its simple and symmetrical construction, the micrometer contemplated herein is economical to manufacture and is readily adaptable to mass production manufacturing methods.

From the foregoing disclosure, it can be observed that we have provided a micrometer which efficiently fulfills the objects as hereinbefore set forth and provides numerous advantages which may be summarized as follows:

(1) Structurally simple, efficient and durable;

(2) Economical to manufacture and readily adaptable to mass production manufacturing principles; and (3) The provision of a micrometer having a five to one finer calibration than conventional micrometers available today, which is easy to read and has a spindle which may be moved to the work to be measured, and said work engaging spindle being non-rotatable, thereby reducing wear on the spindle and providing more accurate measurements.

While we have illustrated a preferred embodiment of our invention, many modifications may be made without departing from the spirit of the invention, and we do not wish to be limited to the precise details of construction set forth but wish to avail ourselves of all changes within the scope of the appended claim.

We claim:

A micrometer gauge including a U-shaped frame and a barrel-shaped housing having a bore therein formed at its inner terminal portion to define a guide bore, said guide bore being particularly characterized by having a plurality of flat sides, said bore having at its outer terminal portion an enlarged circular bore adapted to receive a sleeve liner, an internally threaded sleeve liner having an external periphery complementary to said enlarged bore and received in non-rotatable relationship therein, a second sleeve formed with an external thread complementary to the internal thread of said first named sleeve and received in threadable relationship therewith, said second named sleeve having an internally threaded bore, means defining a work measuring spindle received in said bore, said spindle defining means being particularly characterized by the inclusion of a plurality of flat side portions complementary to said flat sides of said guide bore defining means, said flat sides functioning to prevent rotation of said spindle throughout its travel into and out of work engagement, said spindle having an outwardly extending threaded portion complementary to the internal threads of said second sleeve and received in threadable relationship therewith, said arrangement being further particularly characterized by thimble defining means including a sleeve complementary in internal bore to the periphery of said housing and received thereabout, closure means for said thimble sleeve embracing the same in threaded relationship thereto, said closure means being formed with a bore complementary in size to the external diameter of said second named sleeve and received in driving relationship therein for turning simultaneously said closure member, thimble and second named sleeve, means for driving said closure member and said second named sleeve, said last named means including a cylindrical member having an external diameter complementary to the internal bore of said second named sleeve and adapted to be press fitted therein, a second cylindrical knob carried by said first named cylindrical member in relatively rotatable relationship thereto, and turning force controlling means including ratcheting mechanism interposed between said first named cylindrical member and said cylindrical finger engaging knob.

References Cited in the file of this patent

UNITED STATES PATENTS

| | | |
|---|---|---|
| 672,622 | Isherwood | Apr. 23, 1901 |
| 1,646,393 | De La Mater | Oct. 25, 1927 |
| 2,467,499 | Sachtleber | Apr. 19, 1949 |
| 2,603,876 | Wedin | July 22, 1952 |
| 2,690,016 | Seaholm | Sept. 28, 1954 |

FOREIGN PATENTS

| | | |
|---|---|---|
| 460,987 | France | Oct. 18, 1913 |